United States Patent
Masumoto

(10) Patent No.: US 10,703,885 B2
(45) Date of Patent: *Jul. 7, 2020

(54) TREAD RUBBER COMPOSITION

(71) Applicant: TOYO TIRE CORPORATION, Itami-shi, Hyogo (JP)

(72) Inventor: Yuuki Masumoto, Itami (JP)

(73) Assignee: TOYO TIRE CORPORATION, Itami-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/250,190

(22) Filed: Jan. 17, 2019

(65) Prior Publication Data
US 2019/0144648 A1   May 16, 2019

Related U.S. Application Data

(63) Continuation of application No. 15/285,969, filed on Oct. 5, 2016, now Pat. No. 10,221,303.

(30) Foreign Application Priority Data

Oct. 15, 2015   (JP) ................ 2015-203373

(51) Int. Cl.
*C08L 9/06*     (2006.01)
*C08K 9/10*     (2006.01)
(Continued)

(52) U.S. Cl.
CPC ............... *C08L 9/06* (2013.01); *B60C 1/0016* (2013.01); *C08K 3/04* (2013.01); *C08K 3/36* (2013.01);
(Continued)

(58) Field of Classification Search
CPC ....................................................... C08K 9/10
See application file for complete search history.

(56) References Cited

U.S. PATENT DOCUMENTS

| 4,102,800 A | 7/1978 | Popoff et al. |
| 5,733,393 A | 3/1998 | Hubbell et al. |

(Continued)

FOREIGN PATENT DOCUMENTS

| JP | 2000-26660 A | 1/2000 |
| JP | 2001-151945 A | 6/2001 |

(Continued)

OTHER PUBLICATIONS

Office Action dated Jun. 4, 2019, issued in counterpart JP application No. 2015-203373, with English translation. (7 pages).

(Continued)

*Primary Examiner* — Vickey Nerangis
(74) *Attorney, Agent, or Firm* — Westermann, Hattori, Daniels & Adrian, LLP

(57) ABSTRACT

To provide a tread rubber composition permitting improvement in wet performance without causing worsening of performance with respect to reduction in fuel consumption and/or wear-resistance. Relates to a tread rubber composition comprising a rubber component and particle-encapsulating microcapsules. The particle-encapsulating microcapsules comprise particles and capsule-like organic compound that encapsulates the particles.

7 Claims, 1 Drawing Sheet

(51) Int. Cl.
*B60C 1/00* (2006.01)
*C08K 7/16* (2006.01)
*C08K 3/04* (2006.01)
*C08K 3/36* (2006.01)
*C08K 5/548* (2006.01)
*C08L 7/00* (2006.01)

(52) U.S. Cl.
CPC ............... *C08K 5/548* (2013.01); *C08K 7/16* (2013.01); *C08K 9/10* (2013.01); *C08L 7/00* (2013.01); *C08L 2205/02* (2013.01)

(56) References Cited

U.S. PATENT DOCUMENTS

| | | | |
|---|---|---|---|
| 6,984,450 | B2 | 1/2006 | Menting et al. |
| 7,947,370 | B2 | 5/2011 | Jobmann et al. |
| 8,637,592 | B2 | 1/2014 | Jobmann et al. |
| 10,221,303 | B2 * | 3/2019 | Masumoto ............... C08K 3/04 |
| 2008/0173382 | A1 | 7/2008 | Gobinath et al. |

FOREIGN PATENT DOCUMENTS

| | | |
|---|---|---|
| JP | 2002-226635 A | 8/2002 |
| JP | 2006-274136 A | 10/2006 |
| JP | 2006-336786 A | 12/2006 |
| JP | 2007-532714 A | 11/2007 |
| JP | 2011-46775 A | 3/2011 |
| JP | 2011-148898 A | 8/2011 |
| KR | 10-2009-0029099 A | 3/2009 |
| WO | 2005/108480 A1 | 11/2005 |

OTHER PUBLICATIONS

Suzuki, T et al., "One-step synthesis of "rattle-like" polymer particles via suspension polymerization", Chemical Communications, Jul. 8, 2014, 50, 9921-9924, cited in JP Office Action dated Jun. 4, 2019. (4 pages).

Office Action dated Jan. 7, 2020, issued in counterpart JP Application No. 2015-203373, with English Translation. (8 pages).

Office Action dated Jan. 21, 2020, issued in counterpart DE Application No. 102016116441.0, with English Translation. (11 pages).

* cited by examiner

TREAD RUBBER COMPOSITION

CROSS-REFERENCE TO RELATED APPLICATIONS

This application is a continuation of U.S. application Ser. No. 15/285,969, filed on Oct. 5, 2016, which is based upon and claims the benefit of priority of the prior Japanese Patent Application No. 2015-203373, filed on Oct. 15, 2015, the entire contents of which are incorporated herein by reference.

TECHNICAL FIELD

The present invention relates to a tread rubber composition and to a tire.

BACKGROUND ART

Rubber compositions which contain particulate organic compounds are known. Patent Reference No. 1 describes technology in which reinforcing filler is partially replaced with organic compound particles—hollow particulate styrene-acryl-type cross-linked polymer or the like—for improved stiffness as well as reduced heat generation and wet road surface gripping characteristics. Patent Reference No. 2 describes technology in which a tire having a foam rubber layer which contains microparticle-containing organic particles fabricated as a result of physical mixture of microparticles and molten resin is employed to improve performance on ice, wear-resistance, and manufacturability at the factory.

PRIOR ART REFERENCES

Patent References

PATENT REFERENCE NO. 1: Japanese Patent Application Publication Kokai No. 2000-26660
PATENT REFERENCE NO. 2: Japanese Patent Application Publication Kokai No. 2006-274136
PATENT REFERENCE NO. 3: Japanese Patent Application Publication Kokai No. 2011-148898
PATENT REFERENCE NO. 4: Japanese Patent Application Publication Kokai No. 2011-46775

SUMMARY OF INVENTION

Problem to be Solved by Invention

Performance with respect to reduction in fuel consumption, performance with respect to braking on a wet road surface (hereinafter "wet performance"), wear-resistance, and the like are sought in tires. The hollow particulate styrene-acryl-type cross-linked polymer employed at Patent Reference No. 1 permits improvement in wet performance but causes worsening of performance with respect to reduction in fuel consumption and/or wear-resistance. The microparticle-containing organic particles employed at Patent Reference No. 2 also causes worsening of performance with respect to reduction in fuel consumption and/or wear-resistance.

The present invention was conceived in light of such situation, it being an object thereof to provide a tread rubber composition permitting improvement in wet performance without causing worsening of performance with respect to reduction in fuel consumption and/or wear-resistance.

Means for Solving Problem

To solve the foregoing problems, the present invention is provided with a constitution as described below. That is, the present invention relates to a tread rubber composition comprising rubber component(s) and particle-encapsulating microcapsule(s). The particle-encapsulating microcapsule(s) comprises shell(s) made of organic compound(s), and particle(s) within the shell(s). The particle-encapsulating microcapsule(s) permit improvement in wet performance without causing worsening of performance with respect to reduction in fuel consumption and/or wear-resistance. This is thought to be due to absorption of high-frequency (around 10 kHz) vibration energy acting on tread rubber from fine surface irregularities in the road surface during braking on a wet road surface as a result of conversion of the vibration energy to the kinetic energy of the particles encapsulated therewithin.

The present invention also relates to a tire comprising tread rubber comprising particle-encapsulating microcapsule(s). A tire in accordance with the present invention has better wet performance than a tire having tread rubber that does not contain particle-encapsulating microcapsule(s).

EMBODIMENTS FOR CARRYING OUT INVENTION

A rubber composition associated with an embodiment of the present invention comprises a rubber component. The rubber component might, for example, be natural rubber (NR), diene-type synthetic rubber, and/or the like. The diene-type synthetic rubber might, for example, be isoprene rubber (IR), butadiene rubber (BR), styrene-butadiene rubber (SBR), chloroprene rubber (CR), nitrile rubber (NBR), and/or the like. A rubber composition associated with an embodiment of the present invention may comprise at least one species of rubber component. Styrene-butadiene rubber content is preferably not less than 50 mass % per 100 mass % of the rubber component.

Figure 1:
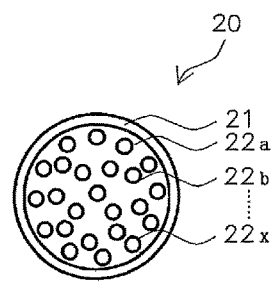
FIG. 1 Schematic sectional diagram of a particle-encapsulating microcapsule.

As shown in FIG. 1, a rubber composition associated with an embodiment of the present invention further comprises particle-encapsulating microcapsule(s) 20. Particle-encapsulating microcapsule 20 comprises particles 22a, 22b, 22x (hereinafter referred to as "particles 22") and capsule-like organic compound 21 which encapsulates particles 22. Particles 22 are capable of moving about within the interior of capsule-like organic compound 21.

Average particle diameter of particle-encapsulating microcapsule 20 is preferably not less than 1 μm, and is more preferably not less than 10 μm. Below 1 μm, it may be impossible to improve wet performance. Average particle diameter of particle-encapsulating microcapsule 20 is preferably not more than 100 μm, and is more preferably not more than 50 μm. Above 100 μm, there is a possibility that this will cause worsening of failure characteristics. Average particle diameter of particle-encapsulating microcapsule 20 may be measured by scanning electron microscopy (SEM).

Particle diameter of particles 22 is preferably not less than 0.01 μm, and is more preferably not less than 0.1 μm. Particle diameter of particles 22 is preferably not more than 10 μm, and is more preferably not more than 5 μm. Particle diameter may be measured by SEM.

It is preferred that there be space present within the interior of capsule-like organic compound 21. Furthermore, liquid or the like may be present within the interior of capsule-like organic compound 21.

Capsule-like organic compound 21 may be formed as an ordinary microencapsulated preparation through polymerization of useful cross-linking monomer(s). Acrylonitrile and other such nitrile-type monomers; acrylate, methacrylate, and other such carboxyl-group-containing monomers; methyl (meth)acrylate, ethyl (meth)acrylate, and other such (meth)acrylic-ester-type monomers; and the like may be cited as examples. Two or more species from among these cross-linking monomers may be used to form a copolymer. Particles 22 might, for example, be particulate organic compound, particulate inorganic compound, and/or the like. The particulate organic compound might, for example, be a polymer of the cross-linking monomers that make up capsule-like organic compound 21, cross-linked resin particles, and/or ordinary resin particles. The particulate inorganic compound might, for example, be zinc oxide, silica, clay, calcium carbonate, aluminum hydroxide, talc, aluminum oxide, magnesium oxide, titanium oxide, and/or the like.

The particle-encapsulating microcapsule might, for example, be manufactured by carrying out polymerization within oil droplets containing organic or inorganic particles, cross-linking monomer, polymerization initiator, and organic solvent that has been dispersed in an aqueous solution.

For every 100 parts by mass of the rubber component, it is preferred that content of the particle-encapsulating microcapsule 20 be not less than 1 part by mass, and more preferred that this be not less than 5 parts by mass. Below 1 part by mass, it may not be possible to improve wet performance. For every 100 parts by mass of the rubber component, it is preferred that content of the particle-encapsulating microcapsule 20 be not more than 20 parts by mass, and more preferred that this be not more than 15 parts by mass. Above 20 parts by mass, there is a possibility that this will cause worsening of failure characteristics.

A rubber composition associated with an embodiment of the present invention may further comprise silica serving as filler. The silica might, for example, be wet silica and/or the like. While there is no particular limitation with respect to the amount of silica blended therein, for every 100 parts by mass of the rubber component it is preferred that this be 10 parts by mass to 120 parts by mass, more preferred that this be 20 parts by mass to 100 parts by mass, and still more preferred that this be 30 parts by mass to 80 parts by mass.

A rubber composition associated with an embodiment of the present invention may further comprise silane coupling agent. The silane coupling agent might, for example, be bis(3-triethoxysilylpropyl)tetrasulfide, bis(3-triethoxysilylpropyl)disulfide, bis(2-triethoxysilylethyl)tetrasulfide, 3-mercaptopropyltrimethoxysilane, 3-mercaptopropyltriethoxysilane, 3-nitropropyltrimethoxysilane, γ-aminopropyltriethoxysilane, and/or the like. It is preferred that content of the silane coupling agent be 5 parts by mass to 15 parts by mass for every 100 parts by mass of silica.

A rubber composition associated with an embodiment of the present invention may further comprise carbon black. The carbon black might, for example, be of the SAF, ISAF, HAF, and/or FEF type. The SAF, ISAF, and HAF types are preferred. For every 100 parts by mass of the rubber component, it is preferred that content of the carbon black be 5 parts by mass to 120 parts by mass, more preferred that this be 20 parts by mass to 100 parts by mass, and still more preferred that this be 30 parts by mass to 80 parts by mass.

A rubber composition associated with an embodiment of the present invention may further comprise oil. The oil might, for example, be paraffin-type process oil, naphthene-type process oil, aromatic-type process oil, and/or the like.

A rubber composition associated with an embodiment of the present invention may further comprise zinc flower, stearic acid, wax, antioxidant, vulcanizing agent, vulcanization accelerator, and/or the like.

The vulcanizing agent might, for example, be sulfur and/or the like. The sulfur might, for example, be powdered sulfur, precipitated sulfur, colloidal sulfur, insoluble sulfur, oil-treated sulfur, and/or the like. For every 100 parts by mass of the rubber component, it is preferred that content of the sulfur be 0.1 part by mass to 10 parts by mass, and more preferred that this be 0.5 part by mass to 5 parts by mass.

The vulcanization accelerator might, for example, be sulfenamide-type vulcanization accelerator, thiuram-type vulcanization accelerator, thiazole-type vulcanization accelerator, thiourea-type vulcanization accelerator, guanidine-type vulcanization accelerator, dithiocarbamate-type vulcanization accelerator, and/or the like. For every 100 parts by mass of the rubber component, it is preferred that content of the vulcanization accelerator be 0.1 part by mass to 5 parts by mass.

A rubber composition associated with an embodiment of the present invention may be manufactured by carrying out kneading using a Banbury mixer, kneader, or other such mixer.

A rubber composition associated with an embodiment of the present invention may be used in the tread rubber of a tire. A tire that contains tread rubber manufactured using a rubber composition associated with an embodiment of the present invention will have better wet performance than a tire having tread rubber that does not contain particle-encapsulating microcapsules 20.

Figure 2:
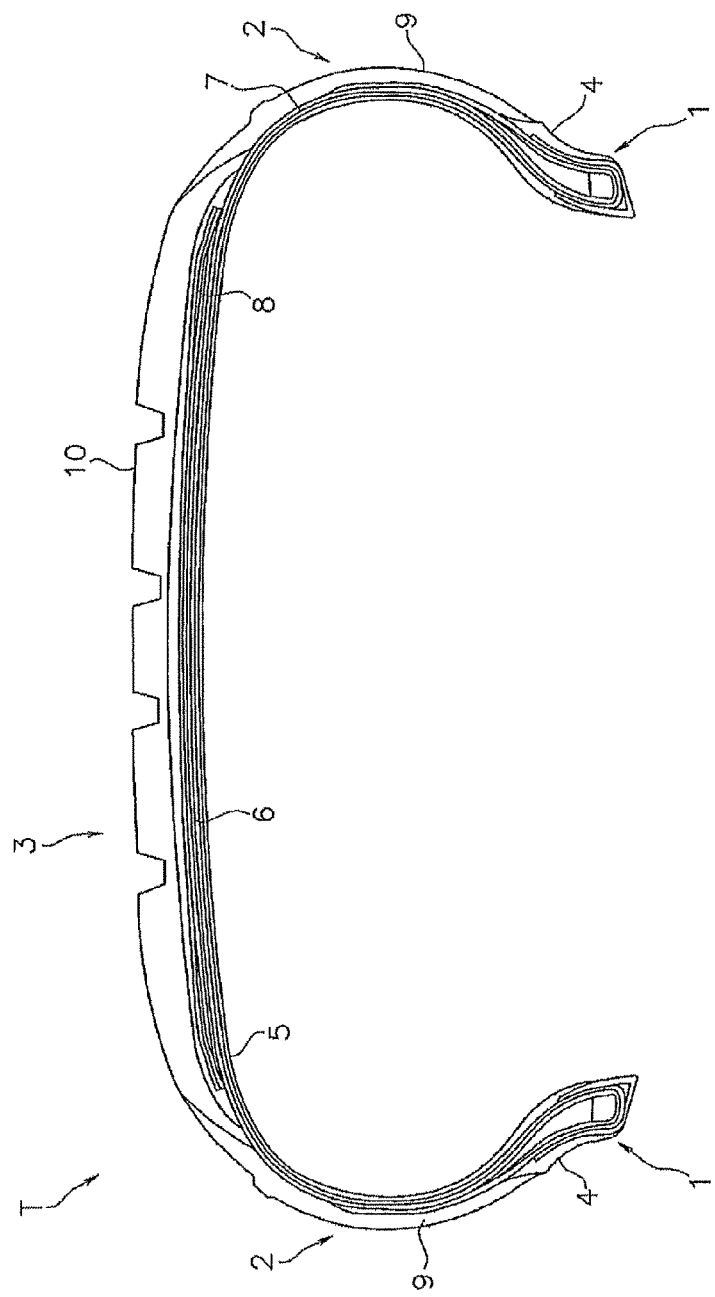
FIG. 2 Schematic sectional diagram of a portion of a tire associated with an embodiment of the present invention.

As shown in FIG. 2, a tire T associated with an embodiment of the present invention comprises a pair of bead regions 1, sidewall regions 2 which extend outwardly in the tire diameter direction from the respective bead regions 1, and a tread region 3 which is contiguous with the respective outer ends in the tire diameter direction of the sidewall regions 2.

Provided between the pair of bead regions 1 is a toroidal carcass layer 7. Provided at a location toward the interior from carcass layer 7 is inner liner rubber 5 for retention of air pressure. Provided at a location toward the exterior from carcass layer 7 at bead region 1 is rim strip rubber 4 which comes in contact with the rim when the tire is mounted on a rim. Provided at a location toward the exterior from carcass layer 7 at sidewall region 2 is sidewall rubber 9. Provided at locations toward the exterior from carcass layer 7 at tread region 3 are belt layer 6, belt reinforcing layer 8, and tread rubber 10. Belt layer 6 comprises a plurality of belt plies. Belt reinforcing layer 8 comprises cord(s) and a rubber coating that coats the cord(s).

Tread rubber 10 comprises particle-encapsulating microcapsules 20. Particle-encapsulating microcapsules 20 are dispersed throughout tread rubber 10.

Tire T may be manufactured using a method comprising an operation in which a green tire comprising unvulcanized tread rubber 10 is fabricated, and an operation in which the green tire is heated. The unvulcanized tread rubber 10 comprises a rubber composition.

WORKING EXAMPLES

Although the present invention is described more specifically below in terms of working examples, it should be understood that the present invention is not to be limited by these working examples.

Manufacture of Rubber Composition

The components except for sulfur and vulcanization accelerator were kneaded together in a Banbury mixer as listed at TABLE 1 to manufacture a mixture. The mixture so obtained was then kneaded together with sulfur and vulcanization accelerator in a Banbury mixer to manufacture a rubber composition. Details regarding the components listed at TABLE 1 were as follows.

| | |
|---|---|
| Styrene-butadiene rubber: | "SBR1723" manufactured by JSR Corporation |
| Butadiene rubber: | "BR150" manufactured by Ube Industries, Ltd. |
| Carbon black: | "SEAST KH" (HAF) manufactured by Tokai Carbon Co., Ltd. |
| Silica: | "Nipsil AQ" manufactured by Tosoh Silica Corporation |
| Oil: | "JOMO Process NC140" manufactured by JX Nippon Oil and Energy Corporation |
| Silane coupling agent: | "Si 75" manufactured by Evonik Industries |
| Zinc Flower: | "Zinc Oxide No. 1" manufactured by Mitsui Mining & Smelting Co., Ltd. |
| Stearic acid: | "LUNAC S20" manufactured by Kao Corporation |
| Wax: | "OZOACE-0355" manufactured by Nippon Seiro Co., Ltd. |
| Antioxidant: | "Antigen 6C" manufactured by Sumitomo Chemical Industry Company Limited |
| Particle-Encapsulating Microcapsule a: | Prepared according to Manufacturing Example 1. PEGDM microcapsules of average particle diameter 15 μm encapsulating PEGDM particles of average particle diameter 1.5 μm. |
| Particle-Encapsulating Microcapsule b: | Prepared according to Manufacturing Example 1. PEGDM microcapsules of average particle diameter 50 μm encapsulating PEGDM particles of average particle diameter 3.5 μm. |
| Particle-Encapsulating Microcapsule c: | Prepared according to Manufacturing Example 2. PEGDM microcapsules of average particle diameter 6 μm encapsulating titanium oxide particles of average particle diameter 0.3 μm. |
| Particle 1: | "XTP8771" manufactured by JSR Corporation (hollow particulate styrene-acryl-type cross-linked polymer of average particle diameter 0.8 μm) |
| Particle 2: | Prepared according to Manufacturing Example 3. Polyethylene particles of average particle diameter 100 μm dispersed within which there was alumina of average particle diameter 20 μm. |
| Sulfur: | "5% Oil-Treated Powdered Sulfur" manufactured by Tsurumi Chemical Industry Co., Ltd. |
| Vulcanization accelerator CZ: | "Soxinol CZ" manufactured by Sumitomo Chemical Industry Company Limited |
| Vulcanization accelerator D: | "Sanceler DM-G" manufactured by Sanshin Chemical Industry Co., Ltd. |

Manufacturing Example 1: Prototype Particle-Encapsulating Microcapsules a and b

Using ethylene glycol dimethacrylate (EGDM) serving as cross-linking monomer, hexadecane and toluene serving as organic solvent, and "VPS-0501" (azo macromolecular initiator containing polydimethylsiloxane unit) manufactured by Wako Pure Chemical Industries, Ltd., serving as polymerization initiator, the direct membrane emulsification method was employed to cause a homogeneous solution of the foregoing to be dispersed within a polyvinyl alcohol aqueous solution as uniform particles to prepare a liquid suspension, polymerization being carried out for 3 hours at 70° C. to obtain particle-encapsulating microcapsules. Particle diameter of the particle-encapsulating microcapsules was controlled by means of the pore diameter of the membrane.

Manufacturing Example 2: Prototype Particle-Encapsulating Microcapsule c

Except for the fact that surface-treated titanium oxide obtained by dissolving methylpolysiloxane in solvent, causing this to be added to and mixed with titanium oxide for which average particle diameter of primary particles was 0.3 μm, and following drying, treating this by baking it through application of heat, was dispersed in oil droplets—Particle-Encapsulating Microcapsules c were prepared using a technique similar to that for Prototype Particle-Encapsulating Microcapsules a and b.

Manufacturing Example 3: Particle 2

100 parts by mass of polyethylene and 15 parts by mass of alumina were mixed together at a temperature not less than the melting point of polyethylene in a Banbury mixer. The resinous mass so obtained was frozen and pulverized, and was thereafter sorted by particle size, to obtain Particle 2.

Manufacture of Tire

Respective rubber compositions were employed at tire tread regions to manufacture test tires of size 195/65R15, and wet braking performance, rolling resistance, and wear-resistance were evaluated.

Evaluation

Wet Braking Performance

Tires were mounted on a 2000-cc FF vehicle, and the distance (hereinafter "braking distance") required to decrease running speed from 90 km/h to 20 km/h with operation of ABS on a wet road surface was measured (average of n=10 trials). Reciprocals of braking distance are shown as indexed relative to a value of 100 for Comparative Example 1. This means that the larger the index the shorter the braking distance—and thus the more excellent the wet road braking performance.

Rolling Resistance

An RR measurement drum was used to measure rolling resistance under conditions of 230 kPa air pressure, 4.4 kN load, 23° C. room temperature, and 80 km/h. Rolling resistance is shown as indexed relative to a value of 100 for Comparative Example 1. This means that the smaller the index the lower—and thus the better—the rolling resistance.

Wear-Resistance

Tires were mounted on a 2000-cc 4 WD vehicle that was made to travel 10000 km. Left/right rotation was carried out every 2500 km. Depth of tread (average of 4 tires) remaining following travel was measured. Results of measurement are shown as indexed relative to a value of 100 for Comparative Example 1. This means that the larger the index the better the wear-resistance.

TABLE 1

|  |  | Comparative Example 1 | Comparative Example 2 | Comparative Example 3 | Working Example 1 | Working Example 2 | Working Example 3 | Working Example 4 |
|---|---|---|---|---|---|---|---|---|
| Amount (parts by mass) | Styrene-butadiene rubber | 70 | 70 | 70 | 70 | 70 | 70 | 70 |
| | Butadiene rubber | 30 | 30 | 30 | 30 | 30 | 30 | 30 |
| | Carbon black | 10 | 10 | 10 | 10 | 10 | 10 | 10 |
| | Silica | 70 | 70 | 70 | 70 | 70 | 70 | 70 |
| | Oil | 30 | 30 | 30 | 30 | 30 | 30 | 30 |
| | Silane coupling agent | 5.6 | 5.6 | 5.6 | 5.6 | 5.6 | 5.6 | 5.6 |
| | Zinc Flower | 2 | 2 | 2 | 2 | 2 | 2 | 2 |
| | Stearic acid | 2 | 2 | 2 | 2 | 2 | 2 | 2 |
| | Wax | 2 | 2 | 2 | 2 | 2 | 2 | 2 |
| | Antioxidant | 2 | 2 | 2 | 2 | 2 | 2 | 2 |
| | Particle-Encapsulating Microcapsule a | — | — | — | 10 | 15 | — | — |
| | Particle-Encapsulating Microcapsule b | — | — | — | — | — | 10 | — |
| | Particle-Encapsulating Microcapsule c | — | — | — | — | — | — | 10 |
| | Particle 1 | — | 10 | — | — | — | — | — |
| | Particle 2 | — | — | 10 | — | — | — | — |
| | Sulfur | 2 | 2 | 2 | 2 | 2 | 2 | 2 |
| | Vulcanization accelerator CZ | 2 | 2 | 2 | 2 | 2 | 2 | 2 |
| | Vulcanization accelerator D | 2 | 2 | 2 | 2 | 2 | 2 | 2 |
| Wet braking performance | | 100 | 105 | 105 | 110 | 113 | 111 | 110 |
| Rolling resistance | | 100 | 105 | 107 | 100 | 101 | 100 | 101 |
| Wear-resistance | | 100 | 90 | 90 | 100 | 99 | 99 | 100 |

At Working Examples 1 and 2, where 10 phr and 15 phr of Particle-Encapsulating Microcapsules a were respectively blended therein, rolling resistance and wear-resistance were at equivalents levels as, and wet braking performance was better than, at Comparative Example 1.

At Working Example 3, where Particle-Encapsulating Microcapsules b were blended therein, rolling resistance and wear-resistance were at equivalents levels as, and wet braking performance was better than, at Comparative Example 1.

At Working Example 4 as well, where Particle-Encapsulating Microcapsules c were blended therein, rolling resistance and wear-resistance were at equivalents levels as, and wet braking performance was better than, at Comparative Example 1.

At Comparative Example 2, wet braking performance was better, but rolling resistance and wear-resistance were worse, than at Comparative Example 1.

At Comparative Example 3, wet braking performance was better, but rolling resistance and wear-resistance were worse, than at Comparative Example 1.

The invention claimed is:

1. A tread rubber composition comprising:
   a rubber component; and
   particle-encapsulating microcapsules comprising particles and a capsule-shaped organic compound that encapsulates the particles,
   wherein the particles are capable of moving about within an interior of the capsule-shaped organic compound, and
   wherein the tread rubber composition is vulcanized.

2. A tread rubber composition according to claim 1 wherein average particle diameter of the particle-encapsulating microcapsules is 1 μm to 100 μm.

3. A tread rubber composition according to claim 1 wherein average particle diameter of the particle-encapsulating microcapsules is 10 μm to 50 μm.

4. A tread rubber composition according to claim 1 wherein particle diameter of the particles is 0.01 μm to 10 μm.

5. A tread rubber composition according to claim 1 wherein particle diameter of the particles is 0.1 μm to 5 μm.

6. A tread rubber composition according to claim 1 wherein the particles comprise polymer.

7. A tread rubber composition according to claim 1 wherein the capsule-shaped organic compound comprises polymer.

* * * * *